March 14, 1961 T. H. LEE ET AL 2,975,256

VACUUM TYPE CIRCUIT INTERRUPTER

Filed July 24, 1958

Inventors:
Thomas H. Lee,
James D. Cobine,
by William Freedman
Their Attorney.

United States Patent Office 2,975,256
Patented Mar. 14, 1961

2,975,256
VACUUM TYPE CIRCUIT INTERRUPTER
Thomas H. Lee, Media, Pa., and James D. Cobine, Rexford, N.Y., assignors to General Electric Company, a corporation of New York
Filed July 24, 1958, Ser. No. 750,784
17 Claims. (Cl. 200—144)

This invention relates to an electric circuit interrupter of the type in which circuit-interruption is effected within a high vacuum. More particularly, the invention relates to a vacuum-type circuit interrupter which is caable of interrupting alternating or other oscillating currents of low magnitude in an inductive circuit without generating objectionably high overvoltages.

Heretofore, the use of vacuum-type circuit interrupters in inductive power circuits has largely been avoided because previously-available vacuum interrupters have generated excessive overvoltages when interrupting low currents (e.g., 500 amperes or below) in such circuits. To understand why this occurs, assume first that it is desired to interrupt a relatively low alternating current, and that, to this end, the usual contacts, or electrodes, of an interrupter connected in the circuit are separated to establish a circuit-interrupting arc. For most conventional interrupters, this arc would persist at least until a first natural current zero were reached, but with a vacuum-type interrupter, this is usually not the case. The vacuum interrupter usually quenches the arc before the natural current zero is reached and, thus, "chops" the current flowing between the contacts, i.e., forces this current abruptly and prematurely to zero before the natural current zero is reached. This sudden change in current induces across any device in the circuit a voltage having a magnitude equal to $I_0Z$ volts, where $I_0$ is the chopping current, i.e., the current level at which chopping is initiated, and Z is the surge impedance of the device in ohms.

Generally speaking, the surge impedance of a device is equal to $$\sqrt{\frac{L}{C}}$$

ohms, where L is the equivalent inductance of the device in henries and C is its equivalent capacitance in farads. Thus, the surge impedance for a capacitive load may be only a few ohms or even less, but for an induction motor the surge impedance may be a few thousand ohms and for a transformer tens and hundreds of thousands of ohms. Thus, in the presence of high surge impedance devices, very high overvoltages may be generated, even if the interrupter chops only, say, ten amperes of current. Previously-available vacuum interrupters of which we are aware have had chopping-current levels ranging from 10 to 40 amperes, and this is simply too high for general application to inductive loads. The maximum value of chopping current which is acceptable with many inductive loads is about four amperes.

Thus, a general object of our invention is to construct a vacuum circuit interrupter in such a manner that it is capable of consistently holding the chopping current level to no more than four amperes when interrupting currents of low magnitude.

A more specific object of our invention is to construct vacuum circuit interrupters in such a manner that they are capable of consistently holding the chopping current level to even lower levels, such as three and even two amperes. For many applications, these are typical maximum acceptable chopping levels.

With a view toward attaining these objects, a novel theory has been derived which is believed to explain the above-described chopping phenomena and which also provides the necessary criteria to enable one to design a new and improved vacuum switch capable of holding the chopping currents below the prescribed maximums. An understanding of this theory can be facilitated by first considering the magnetic pressure inside an arc. The arc will be assumed to have been established between a pair of spaced-apart electrodes, with opposite terminals of the arc attached to the electrodes at points conventionally designated as the anode and cathode spots, respectively. This magnetic pressure inside the arc, which is produced by the magnetic field of the arc itself, tends to constrict or pinch the arc and can be calculated and shown to be equal to:

$$P = 10^{-8} \, I \, J \text{ atmospheres}$$

where P is the pressure at the radial center of the arc in atmospheres, I is the instantaneous current in amperes, and J is the current density in amperes per square centimeter. Within the arc, the region of highest current density is located at generaly the radial center of one of the arc terminals, and usually at the center region of the cathode arc terminal, i.e., in the cathode spot region. Even for the low currents here under consideration the current density in the cathode spot region is very high, e.g., in the neighborhood of $10^5$ to $10^6$ amperes per square centimeter, and, hence, there is a strong force in the region of the cathode spot acting to pinch or constrict the arc.

Proceeding now with the theory, our studies indicate that the only pressure available to counteract this magnetic pressure is the gas and vapor pressure within the arc itself. Unless this gas and vapor pressure is high enough to balance the magnetic pressure, the arc will decrease in cross-section. Such a decrease in cross-section tends to increase the current density, and this, in turn, increases the magnetic pressure (which is directly proportional to current density, as will be observed from the above equation). This increased magnetic pressure tends to further constrict the arc and thereby increase the current density, which, in turn, further increases the magnetic pressure. Thus, a runaway condition begins, with the magnetic pressure constricting the arc and, in this way, becoming even stronger. This runaway condition soon forces the arc to become unstable and, in this way, forces the current prematurely and abruptly to zero, or, in other words, "chops" the current.

For an arc in air, there are many different and frequently unpredictable sources from which the gas and vapor pressure within the arc is derived, but for a properly constructed vacuum interrupter, the only significant source of this pressure is the metallic vapor evaporated from the contacts by the arc. It is the pressure of these metallic vapors alone which must counteract the magnetic pressure in order to maintain arc stability. In the crucial arc-terminal region, the pressure of these metallic vapors approximately corresponds to the vapor pressure of the particular contact material at the particular electrode spot temperatures of the contact material. Accordingly, the particular contact material selected should have a vapor pressure at least as great as the above-described magnetic pressure for those instantaneous electrode spot temperatures prevailing for all currents above the maximum acceptable chopping level. It is our conclusion that unless this condition is satisfied, chopping generally will be initiated at a current above the maximum acceptable value. This conclusion has been confirmed not only by extensive computations but also by an extended series of actual tests on various contact materials. In arriving at this conclusion, it has been assumed that either contact may serve as the cathode during a low current interruption and that arcing gaps of a typical length, e.g., approximately ⅛ inch or greater, are present at the instant of current zero. If one or both of these assumed conditions is not present, then, in some cases, only one of the contacts need be formed of the required high vapor pressure material, as will be explained in greater detail hereinafter.

The chopping current arrived at by calculating the value of current at which the above-described magnetic pressure first begins to exceed the vapor pressure is referred to hereinafter as the "minimum stable current level." This term connotes that for low current A.C. interruptions at instantaneous currents below such a level, a stable arc ordinarily is impossible.

In the computations referred to hereinabove, the instantaneous contact temperatures at the arc center, i.e., the electrode spot temperatures, were computed for a number of different materials by means of an extended digital computer study, which took into account all of the variables believed to be significant, such as conduction, radiation, vaporization, and emission of electrons. By correlating the electrode spot temperatures so computed with vapor pressure and magnetic pressure, it has been possible, on the basis of the above-described theory to obtain substantial quantitative agreement between calculated minimum stable current level and measured chopping levels, i.e., the calculated minimum stable current levels have consistently been found equal to or below the measured chopping levels.

In carrying out our invention in one form in accordance with the theory set forth above, we provide an alternating current vacuum interrupter evacuated to a pressure at least below $10^{-4}$ mm. of mercury. The contacts, or electrodes, of this interrupter are formed of a metallic material comprising a metal having a vapor pressure at temperatures exceeding 2000° K. equal to or more than that of tin. The material has a vapor pressure less than $10^{-3}$ mm. of mercury at 500° K. and is free of sorbed gases to such an extent that if placed in a vacuumized test chamber a few litres in volume and then deeply eroded by repetitive arcing, the pressure level in the test chamber a few cycles after arcing will not have risen substantially from its initial value, even in the absence of getters and pumps and even if the initial pressure is on the order of $10^{-5}$ mm. of mercury. The metal, in addition to meeting the above vapor pressure requirements, should have a thermal conductivity substantially less than that of copper and silver in the event that its vapor pressure does not substantially exceed that of silver. The chemical affinity of the material for oxygen must be relatively low as compared, for example, to that of aluminum and magnesium. Examples of materials which can meet these requirements are tin, antimony, lead, zinc, manganese, bismuth, and suitable alloys thereof. If the material is an alloy, the high vapor pressure metal constituent is present in sufficient quantity to consistently hold the chopping level to no greater than 4 amperes when interrupting currents under 50 amperes peak value.

We are aware of prior suggestions that chopping can be eliminated by using metals such as copper, silver, nickel and aluminum because of their reputed ability to emit electrons at relatively low temperatures. However, our tests with metals such as these indicate that these metals not only are incapable of eliminating chopping, but, quite to the contrary, exhibit chopping characteristics well above the maximum acceptable level of four amperes.

We are also aware that certain of the materials which we use for the contacts of our vacuum-type interrupter have been used for the contacts of interrupters which operate in air and other insulating mediums. However, the use of these materials in non-vacuum-type interrupters has been for purposes basically unrelated to the chopping phenomena which occurs in vacuum interrupters, and their ability to reduce chopping in a high vacuum is not apparent or suggested from any facts previously known with respect to the performance of these materials in air and other insulating mediums.

These materials of the present invention have heretofore been ignored or avoided for the contacts of vacuum interrupters for a number of reasons. Perhaps the main reason is that it has been quite generally believed that the evolution of metallic vapors is something which should be minimized in order to avoid impairing the vacuum and its dielectric strength during the critical intervals of circuit interruption. To minimize such vapor evolution, refractory materials with very high boiling points such as tungsten and molybdenum have generally been used. Contrary to such practice, however, we have found that the interrupting capacity of vacuum switches employing such refractory contacts is, in general, lower than that of comparable switches employing properly-constructed contacts of the high vapor pressure materials of our invention. For example, in comparing contacts formed of zinc, a high vapor pressure metal, with contacts formed of molybdenum, we have been able, under the same transient voltage conditions, to interrupt 9400 amperes with the zinc contacts as compared to only 5700 amperes with the molybdenum contacts. Another reason that the materials of our invention have been generally ignored for vacuum switches is because of the requirement that the contacts of vacuum switch be effectively freed of sorbed gases. It is generally much easier to free a refractory material of sorbed gases, because such materials can be heated to extreme high temperatures to drive off sorbed gases without melting or boiling. But our contact materials would melt and some would even boil in response to such high temperatures, and this introduces complications. These complications together with the lack of previously-apparent advantages have apparently discouraged serious consideration of the high vapor pressure contact materials of our invention for high vacuum switches.

For a better understanding of our invention, reference may be had to the following specification taken in conjunction with the accompanying drawings, wherein.

Figure 1:
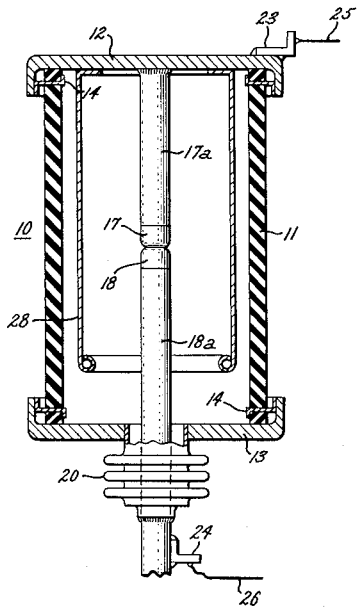
Fig. 1 is a vacuum-type circuit interrupter embodying our invention.

Referring now to the interrupter of Fig. 1, there is shown a highly-evacuated envelope 10 comprising a casing 11 of suitable insulating material and a pair of metallic end caps 12 and 13 closing off the ends of the casing. Suitable seals 14 are provided between the end caps and the casing to render the envelope 10 vacuum-tight.

The normal pressure within the envelope 10 under static conditions is lower than $10^{-4}$ mm. of mercury and is preferably in the range of $10^{-5}$ to $10^{-8}$ mm. of mercury. As is well known, at these low pressures, the vacuum has a very high dielectric strength because there are so few molecules of gas remaining in the envelope that electrons can travel across the various gaps between the high voltage parts of the interrupter with little probability of colliding with the gas molecules that are present. It is these collisions which are primarily responsible for ionization and resultant electrical breakdown. If pressures substantially higher than $10^{-4}$ mm. of mercury were to be utilized, then at least some of the interrupter's potential breakdown paths would be longer than the average distance which the electrons could travel without colliding with a gas molecule. This average distance is commonly called the "mean free path." Only with pressures less than about $10^{-4}$ mm. of mercury is there a reasonable assurance that the mean free path of an electron will be longer than the potential breakdown paths in the switch. It is only under this latter condition that one achieves the high level of dielectric strength that is generally required in a commercial vacuum interrupter, and the present invention is therefore concerned with interrupters that rely upon pressures of less than about $10^{-4}$ mm. of mercury.

Located within the envelope 10 is a pair of separable contacts, or electrodes, 17 and 18, shown in their engaged or closed-circuit position. The upper contact 17 is a stationary contact suitably attached to a conductive rod 17a, which at its upper end is united to the upper end cap 12. The lower contact 18 is a movable contact joined to a conductive operating rod 18a, which is suitably mounted for vertical movement. The operating rod 18a projects through an opening in the lower end cap 13, and a flexible metallic bellows 20 provides a seal about the rod 18a to allow for vertical movement of the rod without impairing the vacuum inside the envelope 10. As is shown in Fig. 1, the bellows 20 is sealingly secured at its respective opposite ends to the operating rod 18a and the end cap 13.

Coupled to the lower end of the operating rod 18a, there is provided suitable actuating means (not shown) which is capable of driving the contact 18 downwardly out of engagement with the contact 17 so as to open the interrupter and which is capable of returning the contact 18 to its illustrated position so as to close the interrupter.

For connecting the interrupter in an alternating power circuit, suitable terminals, schematically illustrated at 23 and 24, are provided. The upper terminal 23 is electrically connected to the upper contact 17 through the conductive parts 12 and 17a, and the lower terminal 24 is connected to the lower contact 18 through the conductive operating rod 24. When the interrupter is in its closed position of Fig. 1, current can flow between terminals 23 and 24 through the engaged contacts 17 and 18.

Assume now that the interrupter is connected in an alternating current power circuit 25, 26 and that it is desired to interrupt current flowing through the circuit. To this end, the contact 18 would be driven downwardly out of engagement with the contact 17 to establish a circuit-interrupting arc. Ideally, this arc would persist until a natural current zero were reached, and thereafter reestablishment of the arc would be prevented by the high dielectric strength of the vacuum. For high current interruptions, for example, above 500 amperes, this ideal is usually achieved inasmuch as the arc usually persists virtually until the natural current zero is reached. But for low current interruptions, the arc frequently does not persist until natural current zero. The interrupter usually quenches the arc ahead of natural current zero and, thus, "chops" the current flowing between the contacts, i.e., forces this current abruptly and prematurely to zero before the natural current zero is reached.

Figure 2:
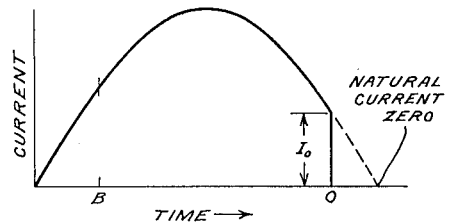
Fig. 2 is a graphic representation illustrating the above-described current-chopping phenomena.

This chopping action is illustrated in Fig. 2, where the current flowing between the contacts is plotted against time. It can be assumed that the contacts are parted to establish an arc at an instant such as depicted at B. The arc is maintained up until about the instant 0 and, hence, the current is free to follow substantially its natural curve up until this instant. At the instant 0, however, the current is forced abruptly and prematurely to zero before the natural current zero is reached. It is this action which is referred to throughout this application as "chopping." The amount of current chopped is designated $I_0$, and this quantity is referred to hereinafter as the "chopping current."

As pointed out hereinabove, the sudden change in current which accompanies chopping induces across any device in the circuit a voltage having a magnitude varying directly with the surge impedance of the device. The surge impedance for a capacitive load or for a substantially fully resistive load is generally very low, and in connection with such loads a relatively high chopping current can be tolerated. This is definitely not the case, however, with the usual inductive loads, which typically have surge impedances thousands and even hundreds of thousands of times greater than the surge impedances of the usual capacitive and substantially fully resistive loads. If the vacuum interrupter is to be used in circuit with typical inductive loads of this nature, the chopping current must be held to a very low value if the generation of excessive overvoltages is to be avoided.

In prior commercially-available vacuum interrupters of which we are aware, the chopping current level has varied anywhere from about 10 to 40 amperes. Such chopping currents may be tolerated in connection with capacitive or fully resistive loads, but they are simply too high for most typical inductive loads. It is primarily for this reason that vacuum interrupters heretofore have not generally been applied to inductive loads. For many inductive loads, the maximum value of chopping current which is acceptable is about four amperes. For many other inductive loads, maximum acceptable values are as low as three, two, and even one ampere. The present invention is concerned with providing vacuum interrupters which are capable of being applied to inductive loads such as these.

In working toward this goal, the novel theory referred to earlier in this specification has been derived. This theory is believed to explain the above-described chopping phenomena and also provides the necessary criteria to enable one to design a vacuum switch capable of holding the chopping currents below the prescribed maximums. Briefly summarizing, it will be recalled that the theory attributes chopping to a condition of arc instability resulting from a lack of vapor pressure in the arc terminal region and, particularly, in the cathode terminal region. Unless the vapor pressure in this region is high enough to balance the constricting magnetic pressure the arc will decrease in cross-section. This decrease in cross-section tends to increase the current density, and this, in turn, increases the magnetic pressure, as will be evident from the magnetic pressure equation set forth hereinabove. This increased magnetic pressure tends to further constrict the arc and thereby increase the current density, which, in turn, further increases the magnetic pressure. Thus, a runaway condition begins, with the magnetic pressure constricting the arc and, in this way, becoming even stronger. This runaway condition soon forces the arc to become unstable and, in this way, forces the current prematurely and abruptly to zero, or, in other words, "chops" the current.

For a properly-constructed vacuum interrupter, the only significant source of this vapor pressure within the arc is the metallic vapor evaporated from the contacts by the arc. It is the pressure of these metallic vapors alone which must counteract the magnetic pressure in order to maintain arc stability. In the crucial arc terminal region, the pressure of these metallic vapors approximately corresponds to the vapor pressure of the particular contact material at the particular electrode spot temperatures of the contact material. Accordingly, the particular contact material selected should have a vapor pressure at least as great as the above-described magnetic pressure for those instantaneous electrode spot temperatures prevailing for all currents above the maximum acceptable chopping level. It is our conclusion that unless this condition is satisfied, chopping generally will be initiated at a current above the maximum acceptable value, i.e., the minimum stable current level will be in excess of the maximum acceptable value. This conclusion is subject to the qualification that in some cases (soon to be explained) only one of the contacts need be of the required high vapor pressure material. This conclusion has been confirmed not only by extensive computations but also by an extended series of actual tests on various contact materials.

In the course of our investigation of this general matter, contact temperatures at the arc center, i.e., the electrode spot temperatures, were computed for a number of different contact materials. These computations took into account all variables believed to be significant, such as conduction, radiation, vaporization, and emission of electrons. By correlating the electrode spot temperatures so computed with vapor pressures and magnetic pressures, it has been possible, on the basis of the above-described theory to obtain substantial quantitative agreement between calculated minimum stable current levels and measured chopping levels, i.e., the minimum stable current levels have consistently been found equal to or below the measured chopping levels.

Figure 3:
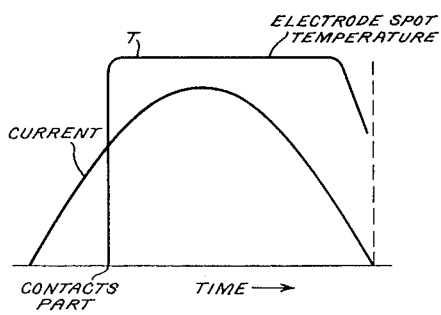
Fig. 3 is another graphic representation illustrating a typical manner in which the contact temperature at the terminal of a low current arc would vary as the current flowing between the contacts varied.

For example, referring to Fig. 3, it has been found from the above-mentioned computations that the electrode spot temperature typically varies in accordance with a curve of the general configuration shown at T, assuming an alternating current having a peak value low enough to involve the chopping phenomena. On the basis of the above-described computations, this curve was plotted for a particular material. At a given value of current in the range where current chopping was anticipated, the electrode spot temperature was determined from the curve T, after which the vapor pressure of the contact material at that temperature was determined from standard vapor pressure charts. Next, this vapor pressure was compared with the magnetic pressure at the center of the arc terminal, the magnetic pressure being computed from the previously-mentioned equation:

$$P = 10^{-8} \times I \times J$$

If this comparison indicated that at the arc terminal center the vapor pressure exceeded the magnetic pressure for this particular current, then the conclusion to be drawn was that this current was above the minimum stable current level. If the vapor pressure was less than the magnetic pressure, then the conclusion to be drawn was that this current was below the minimum stable current level. This series of calculations and comparisons was repeated for various currents until a particular current was found at which the vapor pressure just began falling beneath the magnetic pressure. This current is the minimum stable current level, and according to the above-described theory, a stable arc is ordinarily no longer possible at currents below this level. Working with a number of different metals, such as for example, copper and molybdenum, it has been found that the minimum stable current levels so calculated substantially agreed quantitatively with results of actual tests made with contacts of these particular materials. For example, for molybdenum contacts, the above-described computations indicate that the cathode spot temperature when the instantaneous current is 13 amperes is about 4700° K. At this temperature the vapor pressure of molybdenum is on the order of 0.1 atmosphere. A vapor pressure of this magnitude is barely sufficient to balance the magnetic pressure at this instantaneous current, inasmuch as the magnetic pressure is approximately equal to $10^{-8} \times I \times J$ or $10^{-8} \times 13 \times (5 \times 10^5) = .065$. As the instantaneous current drops beneath 13 amperes, the cathode spot temperature falls at a rapid rate, and this causes a sharp drop in the pressure of the molybdenum vapors. For example, when the current drops to 11 amperes, the temperature drops to about 4150° K. At this temperature the vapor pressure is only on the order of 0.01 atmosphere, but the magnetic pressure is still relatively high $$(\text{i.e. } 10^{-8} \times 11 \times (5 \times 10^5) = .055)$$

even assuming that the current density has not yet increased due to chopping. Since this magnetic pressure exceeds the vapor pressure, the conclusion to be drawn from these calculations based upon the above-described theory is that for low current A.C. interruptions with molybdenum contacts it is ordinarily impossible to maintain an arc for instantaneous currents below a value of above 11 to 13 amperes. Actual tests made with molybdenum contacts have yielded results substantially agreeing with this conclusion.

With the above theory in mind, tests were conducted with contacts made of metals having relatively high vapor pressures in the pertinent temperature range. These tests showed that for contacts of antimony, the representative maximum chopping current level was substantially less than 2 amperes and for contacts containing bismuth also less than two amperes. For contacts of tin the representative maximum chopping current level was about 2.7 amperes. For contacts of silver, the representative maximum chopping current level was approximately 6.5 amperes, and for contacts of copper, approximately 6 amperes. Tests made on contacts of relatively low vapor pressure materials such as tungsten and molybdenum demonstrated representative maximum chopping current levels of about 40 amperes for tungsten and about 12 amperes for molybdenum. Since it is an object of our invention to provide an interrupter which is applicable to circuits in which the maximum acceptable chopping current level is less than four amperes, obviously tungsten, molybdenum, silver and copper are generally not acceptable contact materials for the practice of our invention, at least when used alone and in a pure form for both electrodes. It is to be understood, however, that many materials that are unacceptable in a pure form because of insufficient vapor pressure can be alloyed or mixed with other metals to provide acceptable maximum chopping current levels, and such alloys and mixtures are intended to fall within the broader aspects of this invention.

In arriving at the representative maximum chopping current levels referred to above, a large number of circuit interruptions were effected in a vacuum of about $10^{-5}$ mm. of mercury with contacts formed, at least partially, of the particular materials mentioned. The current interrupted was of a commercial frequency and wave shape and, generally speaking, had a peak value held as low as practical to enable accurate observation of the chopping characteristics. For example, for tin contacts, 60 cycle alternating current having a peak value of about 7 amperes was relied upon. Low currents of this general nature were relied upon because it was found that such currents produced the highest chopping levels and, hence, were the most severe from a chopping viewpoint. The chopping levels decreased only slightly, however, when the peak current was raised to 50 and even 100 amperes. From one interruption to another, some variations were noted in the chopping currents measured for a given contact material, but all of the chopping currents measured with contaminant-free contacts were below the level listed above as the representative maximum. Typically, a majority of the levels measured deviated from the maximum no more than about 30 percent. Conceivably, if the tests were repeated to some unreasonably great extent, a rare test showing chopping currents slightly above the representative maximum could be encountered. Accordingly, the term "representative maximum," as used in this application, is intended to denote the upper value to which the chopping current is consistently held, though not without a possible rare exception.

On the basis of the above tests and calculations, it has been concluded that in order to maintain the chopping current level no higher than four amperes, the vapor pressure of the pertinent contact metal at all of those electrode spot temperatures prevailing for currents about four amperes must be at least equal to the magnetic pressure at the center of the arc terminal. Considering four amperes as a maximum acceptable chopping level and considering, for the moment, pure metals only, the metal found to provide performance nearest the top of the acceptable range of chopping currents was tin. Our calculations indicate that for instantaneous current approaching the representative maximum chopping level for tin, the electrode spot temperature of a tin contact exceeds 2000° K. Considering this as a reference base, metals having a vapor pressure at temperature above 2000° K. below that of tin have generally been found to exhibit representative maximum chopping current levels in excess of four amperes and are, therefore, generally unacceptable where the maximum acceptable level is four amperes. With certain important exceptions, soon to be pointed out, metals having a vapor pressure at temperatures above 2000° K. in excess of the vapor pressure of tin will provide acceptable chopping performance, assuming four amperes to be the maximum acceptable level. In describing the lower vapor pressure metals as unacceptable, we are referring to the use of these metals for both contacts. In certain cases (soon to be described), it is possible to obtain acceptable performance despite the fact that one contact is formed of a so-called unacceptable metal if the other contact is of an acceptable metal.

Figure 4:
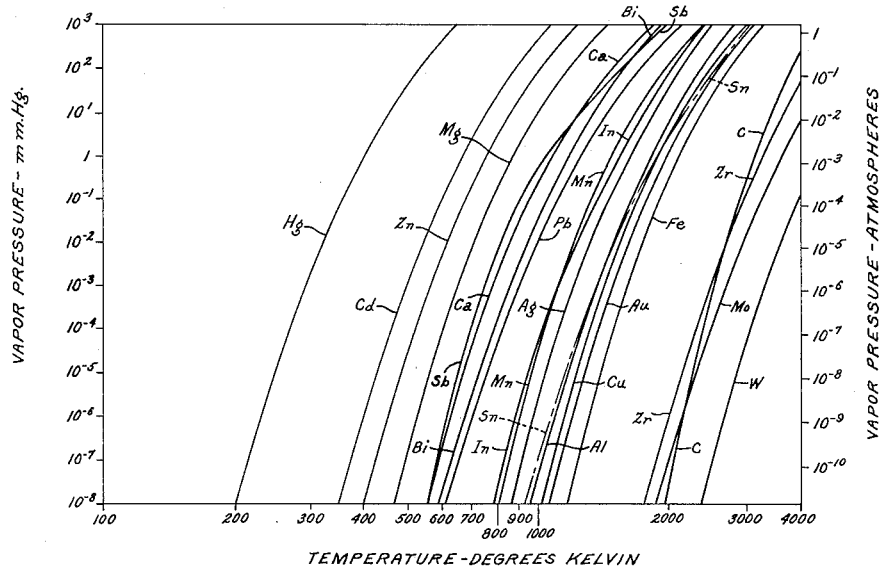
Fig. 4 is a graph showing the vapor pressure of a number of the more common elements plotted against temperature.

To facilitate an explanation of why certain of the higher vapor pressure metals are unacceptable, reference will now be had to the graph of Fig. 4, in which the approximate vapor pressure of a number of more common elements is plotted against temperature. The source for this information is R. E. Honig, "Vapor Pressure Data for the More Common Elements," R.C.A. Review, June 1957, pp. 195–205. Both the vapor pressure and the temperature are plotted on logarithmic scales, with the vapor pressure in terms of atmospheres and millimeters of mercury and the temperature in terms of degrees Kelvin. From this graph, it can be observed that both copper (Cu) and silver (Ag) have vapor pressures exceeding tin (Sn) in the temperature range above 2000° K. In spite of this, however, these two metals, considered alone and in their pure form, are unacceptable and constitute two of the important exceptions referred to in the previous paragraph.

In this latter regard, the representative maximum chopping current level of copper is about 6 amperes and of silver is about 6.5 amperes. The fact that the chopping level for these metals exceeds that of tin is not inconsistent with the above-described general theory, and, as a matter of fact, is readily predictable therefrom for the following reason. The electrode spot temperatures for silver contacts and for copper contacts drop much more rapidly than those for tin contacts (assuming low peak currents), due primarily to the fact that both silver and copper have a much higher thermal conductivity than tin. For example, at 100° C., the thermal conductivities for both copper and silver are on the order of 6 or 7 times greater than that of tin. Because of the above-noted rapid drop in electrode spot temperatures and the resultant lower electrode spot temperatures, silver and copper provide less vapor pressure than tin at a given instantaneous current (in the general range where chopping is to be expected). As a result, the lack of vapor pressure for silver or copper occurs at higher instantaneous current levels than is the case with tin. For copper, this higher instantaneous current level has a representative maximum value of about six amperes, and for silver about 6.5 amperes, both of which are above the maximum acceptable value of four amperes. Thus, it can be said that, for temperatures exceeding 2000° K., the metal of at least one of the contacts, and generally speaking, the cathode contact, should have a vapor pressure at least as great as that of tin, assuming that the thermal conductivity of the metal is less than several times higher than that of tin. If the metal, in this temperature range, has a vapor pressure near that of tin, as is the case with silver and copper, its thermal conductivity should be substantially less than that of silver and copper. The thermal conductivities referred to hereinabove are those thermal conductivities which would be measured in the temperature range of 300° K. to 3000° K.

Some understanding of the importance of the role played by thermal conductivity in the chopping phenomena can be derived by determining for cathodes of various metals, the manner in which the heat dissipated at the cathode is distributed between vaporization and thermal conduction. It follows from what has been set forth hereinabove that the more heat dissipated by thermal conduction, the higher will be the chopping level, assuming the other factors to be equal. Our calculations along this line indicate that for a copper cathode at low currents the ratio of the heat dissipated by vaporization to the heat dissipated by thermal conduction is about 0.25 to 1. For antimony, which has a much lower thermal conductivity, the ratio calculated is about 20 to 1, or approximately 80 times greater than for copper. This wide difference which is due primarily to the respective thermal conductivities of the two metals is indicative of the important role played by thermal conductivity. This difference indicates, for example, that, with copper, a far smaller portion of the power input is utilized to evaporate the cathode metal and hence to produce the vapor pressure which we believe to be necessary to maintain a stable arc.

As examples of metals that have vapor pressures satisfactory for the practice of our invention in its broader aspects, reference may be had to the graph of Fig. 4. Using the above 2000° K. temperature range as a reference base, it will be observed that tin (Sn), indium (In), manganese (Mn), lead (Pb), antimony (Sb), bismuth (Bi), and zinc (Zn) have vapor pressures above or equal to those of tin. All of these metals have low thermal conductivities relative to those of copper and silver and, thus, even the low vapor pressure metals of this particular group have sufficient vapor pressures to hold the chopping currents within the four ampere maximum acceptable limit. Continuing to use the above-2000° K. temperature range as a reference base; gold (Au), iron (Fe), zirconium (Zr), molybdenum (Mo), carbon (C), and tungsten (W) will be seen to have vapor pressures below the tin vapor pressure curve and are therefore incapable of providing acceptable chopping characteristics, at least when used alone and in pure form for both contacts. Although the vapor pressures of silver (Ag) and copper (Cu) are above those of tin in the above-2000° K. temperature range, these metals are rendered unacceptable because of their high thermal conductivities, as was previously-pointed out. Aluminum (Al) and magnesium (Mg) have sufficiently high vapor pressures, but they are unsatisfactory from a chopping viewpoint because of their high affinity for oxygen, as will soon be explained in greater detail. Another factor contributing to the unacceptability of aluminum from a chopping viewpoint is its relatively high thermal conductivity, compared to, say, tin.

Mercury (Hg) and cadmium (Cd) in their pure form are also generally unsatisfactory, not because of insufficient vapor pressure but rather because of excessive vapor pressure. With particular reference to mercury, it will be noted from Fig. 4 that at ordinary ambient temperatures such as 310° K., the vapor pressure of mercury approaches $10^{-2}$ mm. of mercury. This is substantially in excess of the aforementioned maximum permissible pressure of $10^{-4}$ mm. of mercury for the interrupter envelope 10, and thus mercury in its pure form cannot generally be tolerated within the envelope 10. The characteristic vapor pressures of pure cadmium are considerably lower than those of mercury, but still they are so high as to preclude a proper bake-out of the interrupter, as will be explained in greater detail hereinafter.

Although a metal such as copper, silver, molybdenum, tungsten or gold may have a vapor pressure (at its pertinent electrode spot temperatures) too low to render it usable in its pure form, such metals can be used if they are suitably alloyed or mixed with higher vapor pressure metals to form alloys or mixtures which are capable of holding the chopping levels within acceptable limits. For example, although copper alone provides unacceptable chopping performance, copper can be mixed with bismuth to provide excellent performance, e.g., representative maximum chopping currents even under two amperes. With respect to these alloys and mixtures, it is difficult to set precise numerical limits on the proportions of the various component materials which will provide acceptable performance, but, suffice it to say, tin and many of the acceptable higher vapor pressure metals hereinabove-noted can be alloyed or mixed with otherwise unacceptable metals to provide representative maximum chopping levels approaching those obtainable when the acceptable materials are used alone in a pure form.

For example, if one following the teachings of this application wished to rely upon an alloy or mixture of a metal having a vapor pressure at least equal to that of lead with an otherwise unacceptable metal, such as copper or silver, he should have no difficulty in arriving at the proportions of the components needed in order to provide maximum representative chopping levels of two amperes or lower.

A detailed example of a material comprising a metal having a vapor pressure at least equal to that of lead in combination with an otherwise unacceptable metal is a mixture of 20% bismuth and 80% copper. This material has provided representative maximum chopping levels of well below two amperes. A suitable method of preparing alloys of this general nature and contacts from such alloys will soon be described in greater detail.

While the general idea of forming the contacts from alloys employing the acceptable high vapor pressure metals is considered to be a part of the present invention and is broadly claimed in the present application, certain particular alloys falling within the broader aspects of the present invention are specifically claimed in application S.N. 750,614, Lafferty, filed July 24, 1958 and assigned to the assignee of the present invention. The particular alloys claimed in the Lafferty application contain minor percentages of either antimony or bismuth or mixtures thereof and major percentages of either copper or silver or mixtures thereof.

Although it has been pointed out that mercury and cadmium are generally unsatisfactory because of excessive vapor pressure, it is to be understood that mercury and cadmium can be alloyed with other metals to provide satisfactory performance, providing the normal pressure within the envelope remains below about $10^{-4}$ mm. of mercury and providing also that the alloys can meet certain bake-out requirements, as will be explained in greater detail hereinafter.

In order for a contact material to perform in an acceptable manner, it is most important that its arcing surfaces be entirely free of oxides and other contaminants. Otherwise excessive chopping will occur, even though the base metal in an uncontaminated form might have a sufficient vapor pressure. This appears to be explainable on the following basis. Surface contaminants such as oxides, which are the principal contaminants, decompose in response to the heat of the arc. In decomposing, they expose the metal beneath the oxide layer, but this metal is relatively cool because of the low thermal conductivity of the oxides. As a result, the relatively cool exposed metal is not prepared to supply the vapor pressure needed to maintain a stable arc. As a result, chopping can take place at even higher currents than those occurring with the same metals without oxides.

Because of the detrimental effect that oxides and the like produce on the chopping characteristics of the contacts, it is not practical to use for the contacts metals which have a high degree of affinity for oxygen. In this category are metals such as magnesium, calcium, and aluminum. The difficulties involved with such materials may be illustrated by assuming for the moment that aluminum contacts were to be utilized. It would be virtually impossible by any practical assembly method to place these contacts in a vacuum interrupter without their having first acquired an oxide coating. Any exposure to atmospheric air, no matter how brief, within practical limits, would be sufficient to allow this coating to form. It is customary to bake an interrupter during its evacuation in order to remove surface contaminants, but no practical bakeout or other form of heating of which we are aware would remove these oxides without damaging the contacts, inasmuch as aluminum melts at 660° C. but its oxides do not decompose until the temperature reaches several thousand degrees centigrade. Thus, if aluminum contacts were to be used in a practical interrupter, oxides would be present to produce excessive chopping.

An index of a metal's affinity for oxygen and the corresponding difficulty of freeing it from oxides is the free energy of formation of the metallic oxide. If the oxides of a metal have a free energy of formation at 300° K. less than about −100 kilogram calories/gram-atom of oxygen, then the metal is generally not usable for a practical vacuum switch which would hold the chopping levels beneath the previously-prescribed maximum values. Examples of metals with oxides having a free energy of formation less than −100 K cal./gram-atom of oxygen are magnesium, calcium, aluminum, barium and cerium. The source for this information is U.S. Atomic Energy Commission Publication ANL-5750, entitled "The Thermochemical Properties of the Oxides, Fluorides and Chlorides to 2500° K." These metals in their pure form cannot be used for the contacts of a vacuum interrupter constructed in accordance with our invention, even though their vapor pressures might fall into the generally acceptable range. It should be understood, however, that a metal which, in its pure form, might have an excessive affinity for oxygen can be suitably alloyed with other elements to produce alloys which have a relatively weak affinity for oxygen. Properly-constructed contacts formed of such alloys can be used to provide acceptable chopping performance, provided that these alloys are capable of supplying sufficient vapor pressure at the required instantaneous current levels.

The previously-mentioned bake-out of the interrupter is important relative to removing surface contaminants, such as surface-absorbed gases, but it would have no appreciable effect on gases absorbed internally of the contact body. As is now well known, these absorbed gases must also be removed. Otherwise, they would be profusely evolved during those high current interruptions which heat the internal contact regions to high temperatures. The evolution of such gases would impair the dielectric strength of the vacuum at the very instant when maximum dielectric recovery would be needed in order to prevent arc-reestablishment after a current zero and, thus, would be highly undesirable.

For the practice of our invention, the contacts should be free of sorbed gases to such an extent that if placed in a vacuumized test container a few litres in volume and then deeply eroded by repetitive arcing (for example, with commercial power frequency current of about 100 amperes or more), the pressure level in the container a few cycles after arcing will not have risen substantially from its initial value, even in the absence of getters and pumps and even if the initial pressure is on the order of $10^{-5}$ mm. of mercury. The arc-erosion should consume a substantial portion of the contact material and not be merely superficial if the test is to provide an accurate indication of the extent of gas-freedom.

The above-noted requirement that the contacts be effectively free of sorbed gases is, in part, responsible for the fact that most prior commercial vacuum switches have utilized contacts of a refractory material, such as tungsten or molybdenum. Such materials are considerably easier to free of sorbed gases than those having lower melting and boiling points inasmuch as they can be heated to very high temperatures without melting or excessively vaporizing. These very high temperatures effectively decompose surface contaminants and drive off much of the absorbed gases. This permits the gas removal process to be carried out on the contacts after they have been suitably fabricated.

To free the metals of our invention from absorbed gases and other impurities, it is generally necessary to resort to more involved techniques, such as, for example, repeated arc-melting in a vacuum. If an alloy is to be relied upon, the individual constituents of the alloy are degassed (for example, by repeated vacuum arc-melting) before the alloying step. An ingot or the like prepared by such a technique is then used as a blank from which the contacts are suitably fabricated and then incorporated into the interrupter. The interior of the contact metal generally does not reabsorb a significant amount of the gases once it has been adequately degassed (provided its temperature is not permitted to rise appreciably above normal ambient temperatures), but surface contaminants may form during the assembly operation. These contaminants can be removed by suitable bakeout or other well-known heating techniques during evacuation of the interrupter.

A minimum temperature for such bakeout of the interrupter is about 500° K. Temperatures of this order cause certain materials to vaporize to such a great extent that they would not be satisfactory for use as contacts in our interrupter. This is the case because if excessive vapors are generated during bakeout, the vapors, upon condensing, detrimentally coat the insulating surfaces of the switch to an objectionably great extent. For this reason, a material having a vapor pressure greater than about $10^{-3}$ mm. of mercury at 500° K., e.g., cadmium in pure form, would be unacceptable for either of the contacts of our interrupter.

Even certain of the metals which have vapor pressures in the acceptable range have some properties which render them difficult to use in pure form for the contacts of a vacuum switch. For example, indium, tin, and bismuth have rather low-melting points, and for this reason it is difficult to bake out such contacts sufficiently to remove the surface-absorbed gases. Some of these metals are also disadvantageous from a contact-welding viewpoint and also from a mechanical strength viewpoint. Such difficulties can be overcome by using these materials in combination with suitable additional materials capable of imparting the required characteristics to the overall contact material. Depending upon the characteristics required, the added materials may be of a refractory nature, or may have melting points lower than those normally associated with refractory materials. Examples of suitable nonrefractory components are copper, silver and nickel. Particularly alloys employing silver and copper which are especially advantageous are disclosed and claimed in the aforementioned Lafferty application. Examples of suitable refractory components are tungsten, molybdenum, and refractory compounds thereof. With regard to such refractory compounds, the carbides of refractory metals such as molybdenum and tungsten are particularly advantageously utilized in forming vacuum switch contacts in accord with present invention. This is because when a refractory carbide is present at the foot point of a vacuum arc, the carbide is dissociated by the heat of the arc, forming atomic carbon, a powerful getter for most gases. Thus, the use of a carbide matrix provides in the vacuum interrupters of the present invention, a continuously replenished gettering agent for any residual gases which may tend to accumulate due to infinitesimal gaseous inclusions in the arc-electrodes or other portions of the interrupter device.

While various manufacturing procedures are suitable for combining the several components of the overall contact material, the following procedure is one which we have found to be especially suited to the preparation of contact materials including a refractory component. A porous compact of the refractory material is first vacuum-fired to a very high temperature such as 2000° C. to remove the sorbed gases and decompose oxides. Then the temperature of the compact is lowered to the neighborhood of the melting point of the high vapor pressure material, after which a piece of the high vapor pressure material is placed in contact with the surface of the compact. Due to the high temperature of the refractory compact, the high vapor pressure metal melts and flows into the pores of the compact. The entire assembly is then cooled in a vacuum.

Prior to the impregnation step, the high-vapor pressure material was degassed to a high degree, preferably by the repeated vacuum-arc-melting technique previously mentioned. This renders the composite material free of internally absorbed gases to an effectively high extent. The degree of impregnation can be improved by firing the refractory compact in hydrogen one or more times prior to the aforementioned vacuum firing step.

Surface contaminants can be removed from the impregnated compact by heating the compact during evacuation of the interrupter. This surface cleansing can be performed at much higher temperatures than are permissible with contacts made of the impregnating material above. In this regard, the compact acts in the manner of a sponge to hold the impregnant in place, even though the impregnant might reach the molten state.

In the final contact, the refractory compact acts to impart structural strength and to inhibit contact welding.

A specific example of satisfactory contacts formed in this manner are contacts formed from a tungsten compact impregnated with tin.

Another manufacturing procedure that can be utilized for combining the components of the contact material and which is especially suited for use with non-refractory materials is as follows. The components to be combined are first degassed to the required high extent by the vacuum-arc melting technique previously referred to. The components, which are then in the liquid state, are suitably mixed together in a high-vacuum, employing known alloying techniques. Thereafter the liquid mixture is allowed to solidify, thus producing the desired gas-free alloy or mixture. This alloy or mixture can be used either alone or to impregnate a porous mass of metallic material, in the manner described hereinabove.

Many such alloys or mixtures have relatively high melting points in comparison to those of the high-vapor-pressure pure metals which might be constituents of the alloy. Moreover, many such alloys and mixtures are much stronger, harder and have less tendency to weld than high-vapor-pressure pure metals which might be included in the alloy or mixture. Thus, it will be apparent that many of the difficulties, such as low-melting point, welding, and low mechanical strength, encountered with certain of the acceptable pure metals can be overcome by suitably alloying or mixing them with other materials. Thus, alloying and mixing, instead of or in addition to the previously-described impregnation procedure, can be relied upon to impart desirable contact characteristics to the high vapor pressure materials. Furthermore, metals with excessive vapor pressures in their pure form, such as cadmium and mercury, can be rendered acceptable by suitably alloying them with other metals.

The term "alloy," as used in this application, is intended to be broad enough to comprehend within its meaning intimate mixtures and other combinations of metals which are essentially insoluble in each other, as well as the more common type of alloy which comprises elements that are mutually soluble in each other. Some of the impregnated refractory materials referred to hereinabove are examples of intimate mixtures of metals undissolved in each other which are considered to be comprehended within the term "alloy."

As a possible aid to providing a more complete understanding of the present invention, the following chart setting forth certain pertinent characteristics of various contact materials is provided:

|    | Vapor Press. at 500° K., mm. of Hg. | Vapor Press. at 2,000° K., mm. of Hg. | Thermal Conductivity [1] at— | Representative Maximum Chopping Level [2] (Amperes) | Chemical Affinity for Oxygen [4] |
|----|----|----|----|----|----|
|    |    |    | °C |    |    |
| Al | $<10^{-8}$ | 7 | 0.49 100 | >5 | −120 to −130 |
| Ag | $<10^{-8}$ | 40 | 0.992 100 | >6 | 0 to −10 |
| Bi | $<10^{-8}$ | >760 | 0.016 100 | [3] <2 | −40 to −50 |
| Mo | $<10^{-8}$ | $<10^{-6}$ | 0.346 17 | >10 | −50 to −60 |
| Sb | $<10^{-8}$ | >760 | 0.040 100 | <2 | −40 to −50 |
| Sn | $<10^{-8}$ |  | 3 0.145 100 | between 2 and 4 | −60 to −70 |
| W  | $<10^{-8}$ | $<10^{-8}$ | 0.35 18 | >10 | −60 to −65 |
| Cu | $<10^{-8}$ |  | 3 0.908 100 | >6 | −30 to −40 |

[1] The thermal conductivities are given in calories per centimeter cube per degree centigrade.
[2] The representative maximum chopping levels were measured in accordance with the procedure set forth earlier in this specification.
[3] The representative maximum chopping level of bismuth was measured with a Cu-Bi mixture containing 20% Bi.
[4] The chemical affinity for oxygen is expressed in terms of the free energy of formation of metallic oxides at 300° K. in kilogram-calories per gram atom of oxygen.

Vapor pressure data is not readily available for alloys, but as a general rule, for those alloys in which the constituents are mutually soluble elements, i.e., solid solution alloys, the vapor pressure of the alloy will be less than the vapor pressure of the higher vapor pressure element and greater than the vapor pressure of the lower vapor pressure element. For example, an alloy of 15% cadmium and 85% silver, which is a solid solution alloy, has a vapor pressure between that of silver and cadmium. The thermal conductivity of this alloy is substantially lower than that of silver, and the representative maximum chopping level of such alloy is between 3 and 4 amperes.

As another general rule, if the alloy is composed of two immiscible elements with large differentials in vapor pressures, the vapor pressure of the alloy is governed primarily by the vapor pressure of the higher vapor pressure element. For this alloy vapor pressure to be controlling in the chopping phenomena, a sufficient percentage of the higher vapor pressure element should be present and a sufficiently uniform distribution of the higher vapor pressure element should be present to insure that the electrode spot for pertinent currents (i.e., the low currents which produce chopping) is consistently located on a particle of the higher vapor pressure element. For example, for a mixture composed of 20% bismuth and 80% copper, which are two immiscible elements, the effective vapor pressure of the mixture generally corresponds to that of bismuth, the higher vapor pressure element. The thermal conductivity of the mixture is between that of copper and bismuth, and the representative maximum chopping level is less than 2 amperes, assuming a generally uniform distribution of the bismuth particles throughout the copper.

Our computations and tests indicate that, for a majority of the applications where chopping conditions are present, the chopping level is dependent to a much lesser degree upon the particular metal selected for the anode of the interrupter than it is upon the particular material selected for the cathode. In spite of this, however, we prefer to form both electrodes of the high vapor pressure materials of our invention. This is the case because if the interrupter is connected in an A.C. circuit and it is tripped open in the usual manner, i.e., without regard to the instantaneous polarity of the circuit current, then it cannot be predetermined with certainty which electrode will serve as the cathode and which as the anode during the half-cycle interrupting interval. Therefore, to assure that the particular electrode acting as the cathode will be of the high vapor pressure material of our invention, we prefer to form both electrodes of such material. Whether the same or dissimilar ones of these high vapor pressure materials are used for the respective electrodes depends upon what other characteristics are desired from the electrodes, and we therefore wish it understood that our invention is not limited to the use of identical materials for the two electrodes.

It should also be understood that in those applications where chopping depends predominately upon the cathode material and where it can be predetermined that a particular one of the electrodes will serve as the cathode during the half-cycle interrupting interval, this electrode alone can be formed of the high vapor pressure materials of our invention, and the other electrode can, if desired, be formed of some other suitable metal, even a metal with a much lower vapor pressure. For such applications, however, all of those electrode regions upon which the cathode spots for low current arcs are likely to be established are formed of the high vapor pressure materials of our invention (either in pure form or in suitable alloy form, as explained hereinabove).

Although, generally speaking, the chopping level is predominately dependent upon the particular cathode material selected, as has been pointed out hereinabove, there are some exceptional cases where the particular anode material is important. This can be illustrated by reference to certain tests that have been conducted with contact pairs in which one of the contacts was of antimony and the other of molybdenum. Whenever the antimony contact was made the cathode, the chopping level was always characteristic of antimony, even for very short arcing gaps, e.g., on the order of ⅛ inch and less. But when the molybdenum contact was made the cathode, the chopping level was characteristic of molybdenum only for arcing gaps of about ½ inch or longer. When the molybdenum cathode was used with shorter arcing gaps, e.g., ⅛ inch and less, the chopping level was substantially lower than the characteristic level of molybdenum. This reduced chopping level, we attribute to antimony vapors evaporated by the arc from the anode. In this regard, for very short gaps, the antimony anode is so close to the molybdenum cathode that the antimony vapors can contribute to the pressure of the vapors at the cathode arc terminal, thus helping to maintain the arc stable for instantaneous currents below the characteristic chopping level of molybdenum. Thus, where very short arcing gaps are relied upon, it is possible to obtain acceptable chopping levels even where only the anode is formed of the high vapor materials of our invention.

Although our invention has been described hereinabove particularly in connection with the interruption of conventional alternating current, we wish it to be further understood that it is equally applicable to the interruption of any oscillating current of the type that has recurrent natural current zeros, even if the oscillating current is unidirectional. The term "zero," as used in the preceding sentence, is intended to denote current magnitudes not only precisely equal to zero but those closely approaching zero and within the chopping range of the particular interrupter being relied upon. In connection with this latter type of oscillating current, an interrupter constructed in accordance with our invention effects circuit interruption immediately prior to a natural current zero in substantially the same manner as described hereinabove with reference to the interruption of conventional alternating current. Where the interrupter of our invention is utilized in connection with such oscillating unidirectional currents, it will be apparent that one of the electrodes of the interrupter will always serve as the cathode and the other as the anode during the half-cycle interrupting interval. If the application is one in which the chopping level is predominately dependent upon the material used for the cathode, it will be apparent that in such applications only the cathode need be formed of the particular materials of this invention in order consistently to hold the chopping current to levels below the maximum acceptable values.

For protecting the insulation of a vacuum-type interrupter from the build-up of a metallic coating thereon, it is customary to provide a vapor-condensing shield between the arcing gap of the interrupter and the protected insulating surface. Such a shield is shown in Fig. 1 in the form of a metallic tube 28 suitably fixed to the end cap 12 and interposed between the contacts 17, 18 and the casing 11. Metallic vapors emitted from the contacts as a result of arcing condense on this shield 28 before they can reach the casing 11 and are thus prevented from condensing on the internal surface of casing 11.

Although we have described our invention in connection with a vacuum switch, it is to be understood that certain aspects of the invention are also applicable to other types of interrupters, such as lightning-arresters, wherein there is no relative movement between the electrodes.

While we have shown and described particular embodiments of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. An alternating current circuit interrupter of the vacuum-type comprising: an envelope evacuated to a pressure lower than $10^{-4}$ mm. of mercury; a pair of spaced apart terminals for connection to an alternating power circuit; a pair of electrodes located within said envelope, connected in circuit with said terminals, and disposed in spaced-apart relationship during a circuit-interrupting operation to allow for the establishment of a circuit-interrupting arc therebetween; each of said electrodes having a region on which the respective electrode spots for a low current arc are adapted to be maintained; each of said electrode regions being formed of a material having a vapor pressure less than $10^{-3}$ mm. of mercury at 500° K.; said material comprising a metal having a vapor pressure at least as great as that of tin at temperatures exceeding 2000° K.; said metal being present in sufficient quantity to hold the representative maximum current chopping level to no greater than 4 amperes when interrupting currents of less than 50 amperes peak value; said electrode regions being free of sorbed gases and contaminants to such an extent that if placed in a vacuumized chamber a few litres in volume and then deeply eroded by repeated electric arcing the pressure level in said chamber a few cycles after arcing will remain at least as low as substantially its initial value, even in the absence of getters and pumps, and even if the initial pressure in the chamber is on the order of $10^{-5}$ mm. of mercury; said metal having a thermal conductivity substantially less than that of copper and silver if the metal is one having characteristic vapor pressures generally equalling or lower than those of silver for given temperatuers; and the chemical affinity of said material for oxygen being relatively low as compared to that of aluminum, magnesium, and calcium.

2. The circuit interrupter of claim 1 in which at least one of said electrode regions is formed of a porous body of metallic substance impregnated with the material defined in claim 1.

3. An alternating current circuit interrupter of the vacuum type comprising: an envelope evacuated to a pressure lower than $10^{-4}$ mm. of mercury; a pair of terminals for connection to an alternating power circuit; a pair of electrodes located within said envelope, connected in circuit with said terminals, and disposed in spaced-apart relationship during a circuit interrupting operation to allow for the establishment of a circuit-interrupting arc therebetween; each of said electrodes having a region on which the respective electrode spots for a low current arc are adapted to be maintained, each of said electrode regions being formed of a porous body of refractory substance impregnated with a material having a vapor pressure less than $10^{-3}$ mm. of mercury at 500° K.; said material comprising a metal having a vapor pressure at least as great as that of tin at temperatures exceeding 2000° K.; said metal being present in sufficient quantity to hold the representative maximum current chopping level to no greater than 4 amperes when interrupting currents of less than 50 amperes peak value; said electrode regions being free of sorbed gases and contaminants to such an extent that if placed in a vacuumized chamber a few litres in volume and then deeply eroded by repeated electric arcing the pressure level in said chamber a few cycles after arcing will remain at least as low as substantially its initial value, even in the absence of getters and pumps and even if the initial pressure in the test chamber is on the order of $10^{-5}$ mm. of mercury; said metal having a thermal conductivity substantially less than that of copper and silver if the metal is one having characteristic vapor pressures generally equalling or lower than those of silver for given temperatures; and the chemical affinity of said material for oxygen being relatively low as compared to that of aluminum, magnesium, and calcium.

4. An alternating current circuit interrupter of the vacuum-type comprising: an envelope evacuated to a pressure lower than $10^{-4}$ mm. of mercury; a pair of spaced apart terminals for connection to an alternating power circuit; a pair of electrodes located within said envelope, connected in circuit with said terminals, and disposed in spaced-apart relationship during a circuit-interrupting to allow a circuit-interrupting arc to be established therebetween; each of said electrodes having a region on which the respective electrode spots for a low current arc are adapted to be maintained; each of said electrode regions being formed of an alloy having a vapor pressure less than $10^{-3}$ mm. of mercury at 500° K.; said alloy including as one of its components a metal having a vapor pressure at least as great as that of tin at temperatures exceeding 2000° K.; said metal being present in sufficient quantity to hold the representative maximum current chopping level to no greater than 4 amperes when interrupting currents of less than 50 amperes peak value; said electrode regions being free of sorbed gases and contaminants to such an extent that if placed in a vacuumized test chamber a few litres in volume and then deeply eroded by repeated electric arcing, the pressure level in said test chamber a few cycles after arcing will remain substantially as low as its initial value, even in the absence of getters and pumps and even if the initial pressure in the test chamber is on the order of $10^{-5}$ mm. of mercury; said metal having a thermal conductivity substantially less than that of copper and silver if the metal is one having characteristic vapor pressures generally equalling or lower than those of silver for given temperatures; and the chemical affinity of said alloy for oxygen being relatively low as compared to that of aluminum, magnesium, and calcium.

5. An alternating current circuit interrupter of the vacuum type comprising: an envelope evacuated to a pressure lower than $10^{-4}$ mm. of mercury; a pair of spaced-apart terminals for connection to an alternating power circuit; a pair of electrodes located within said envelope, connected in circuit with said terminals, and disposed in spaced-apart relationship during a circuit-interrupting operation to allow for the establishment of a circuit-interrupting arc therebetween; each of said electrodes having a region on which the respective electrode spots for a low current arc are adapted to be maintained; each of said electrode regions being formed of a material comprising a metal having a vapor pressure at least as great as that of lead; said metal being present in sufficient quantity to hold the representative maximum current chopping level to no greater than 4 amperes when interrupting currents of less than 50 amperes peak value; said material having a vapor pressure less than $10^{-3}$ mm. of mercury at 500° K.; said electrode regions being free of sorbed gases and contaminants to such an extent that if placed in a vacuumized chamber a few litres in volume and then deeply eroded by repeated electric arcing, the pressure level in said chamber will remain substantially as low as its initial value, even in the absence of getters and pumps and even if the initial pressure in the chamber is on the order of $10^{-5}$ mm. of mercury; and the chemical affinity of said material for oxygen being relatively low as compared to that of aluminum, magnesium, and calcium.

6. The circuit interrupter of claim 5 in which at least one of said electrode regions is formed of a porous body of metallic substance impregnated with the material defined in claim 5.

7. The interrupter of claim 5 in which said material is an alloy including said metal as one of its constituents.

8. An alternating current circuit interrupter of the vacuum-type comprising: an envelope evacuated to a pressure lower than $10^{-4}$ mm. of mercury; a pair of spaced-apart terminals for connection to an alternating current power circuit; a pair of electrodes located within said envelope, connected in circuit with said electrodes, and disposed in spaced-apart relationship during a circuit-interrupting operation to allow for the establishment of a circuit-interrupting arc therebetween; each of said electrodes having a region on which the respective electrode spots for a low current arc are adapted to be maintained; each of said electrode regions being formed of a material comprising a metal having a vapor pressure at least as great as that of lead in a sufficient quantity to hold the maximum representative chopping current level to about two amperes when interrupting currents of less than 50 amperes peak value; said material having a vapor pressure less than $10^{-3}$ mm. of mercury at 500° K.; said electrode regions being free of sorbed gases and contaminants to such an extent that if placed in a vacuumized chamber a few litres in volume and then deeply eroded by repeated electric arcing the pressure level in said chamber will remain substantially as low as its initial value, even in the absence of getters and pumps and even if the initial pressure in the chamber is on the order of $10^{-5}$ mm. of mercury; and the chemical affinity of said material for oxygen being relatively low as compared to that of aluminum, magnesium, and calcium.

9. An alternating current circuit interrupter of the vacuum-type comprising: an envelope evacuated to a pressure lower than $10^{-4}$ mm. of mercury; a pair of spaced-apart terminals for connection to an alternating power circuit; a pair of electrodes located within said envelope, connected in circuit with said terminals, and disposed in spaced-apart relationship during a circuit-interrupting operation to allow for the establishment of a circuit-interrupting arc therebetween; each of said electrodes having a region on which the respective electrode spots for a low current arc are adapted to be maintained; each of said electrode regions being formed of a material comprising a metal having a vapor pressure at least as great as that of lead in a sufficient quantity to hold the maximum representative chopping current level to no more than four amperes when interrupting currents of less than 50 amperes peak value; said material having a vapor pressure less than $10^{-3}$ mm. of mercury at 500° K.; said electrode regions being free of sorbed gases and contaminants to such an extent that if placed in a vacuumized chamber a few litres in volume and then deeply eroded by repeated electric arcing the pressure level in said chamber will remain substantially as low as its initial value, even in the absence of getters and pumps and even if the initial pressure in the chamber is on the order of $10^{-5}$ mm. of mercury; and the chemical affinity of said material for oxygen being relatively low as compared to that of aluminum, magnesium, and calcium.

10. A vacuum type circuit interrupter for interrupting a power circuit carrying oscillating current having recurrent natural current zeros comprising: an envelope evacuated to a pressure lower than $10^{-4}$ mm. of mercury; a pair of spaced-apart terminals for connection to said power circuit; electrode structure comprising a pair of electrodes located within said envelope, connected in circuit with said terminals, and disposed in spaced-apart relationship during a circuit-interrupting operation to allow for the establishment of a circuit-interrupting arc therebetween; said electrode structure having at least one predetermined region on which the cathode spot for substantially all low current arcs is adapted to be maintained; any such predetermined region being formed of a material having a vapor pressure less than $10^{-3}$ mm. of mercury at 500° K.; said material comprising a metal having a vapor pressure at least as great as that of tin at temperatures exceeding 2000° K.; said metal being present in sufficient quantity to hold the representative maximum current chopping level to no greater than 4 amperes when interrupting currents of less than 50 amperes peak value; said predetermined electrode region being free of sorbed gases and contaminants to such an extent that if placed in a vacuumized chamber a few litres in volume and then deeply eroded by repeated electric arcing the pressure level in said chamber a few cycles after arcing will remain at least as low as substantially its initial value, even in the absence of getters and pumps, and even if the initial pressure in the chamber is on the order of $10^{-5}$ mm. of mercury; said metal having a thermal conductivity substantially less than that of copper and silver if the metal is one having characteristic vapor pressures generally equalling or lower than those of silver for given temperatures; and the chemical affinity of said material for oxygen being relatively low as compared to that of aluminum, magnesium, and calcium.

11. The interrupter of claim 10 in which said material is an alloy including said metal as one of its components.

12. A vacuum-type current circuit interrupter for interrupting a power circuit carrying oscillating current having recurrent natural current zeros comprising: an envelope evacuated to a pressure lower than $10^{-4}$ mm. of mercury; a pair of spaced-apart terminals for connection to said power circuit; a pair of electrodes located within said envelope, connected in circuit with said terminals, and disposed in spaced-apart relationship during a circuit-interrupting operation to allow for the establishment of a circuit-interrupting arc therebetween; one of said electrodes having a predetermined region on which one of the electrode spots for substantially all low current arcs is adapted to be maintained; said predetermined electrode region being formed of a material having a vapor pressure less than $10^{-3}$ mm. of mercury at 500° K.; said material comprising a metal having a vapor pressure at least as great as that of tin at temperatures exceeding 2000° K.; said metal being present in sufficient quantity to hold the representative maximum current chopping level to no greater than 4 amperes when interrupting currents of less than 50 amperes peak value; said electrode region being free of sorbed gases and contaminants to such an extent that if placed in a vacuumized chamber a few litres in volume and then deeply eroded by repeated electric arcing the pressure level in said chamber a few cycles after arcing will remain at least as low as substantially its initial value, even in the absence of getters and pumps, and even if the initial pressure in the chamber is on the order of $10^{-5}$ mm. of mercury; said metal having a thermal conductivity substantially less than that of copper and silver if the metal is one having characteristic vapor pressures generally equalling or lower than those of silver for given temperatures; and the chemical affinity of said material for oxygen being relatively low as compared to that of aluminum, magnesium, and calcium.

13. The interrupter of claim 12 in which said predetermined electrode region is formed of a porous body of a refractory metal carbide impregnated with the material defined in claim 1.

14. A vacuum-type circuit interrupter for interrupting a power circuit carrying oscillating current having recurrent natural current zeros comprising: an envelope evacuated to a pressure lower than $10^{-4}$ mm. of mercury; a pair of spaced-apart terminals for connection to said power circuit; a pair of electrodes located within said envelope, connected in circuit with said terminals, and disposed in spaced-apart relationship during a circuit-interrupting operation to allow for the establishment of a circuit-interrupting arc therebetween; one of said electrodes having a predetermined region on which one of the electrode spots for substantially all low current arcs is adapted to be established; said predetermined electrode region being formed of a materal comprising a metal having a vapor pressure at least as great as that of lead; said metal being present in sufficient quantity to hold the representative maximum current chopping level to no greater than 4 amperes when interrupting currents of less than 50 amperes peak value; said material having a vapor pressure less than $10^{-3}$ mm. of mercury at 500° K.; said electrode region being free of sorbed gases and contaminants to such an extent that if placed in a vacuumized chamber a few litres in volume and then deeply eroded by repeated electric arcing the pressure level in said chamber will remain substantially as low as its initial value, even in the absence of getters and pumps and even if the initial pressure in the chamber is on the order of $10^{-5}$ mm. of mercury; and the chemical affinity of said material for oxygen being relatively low as compared to that af aluminum, magnesium, and calcium.

15. The interrupter of claim 14 in which said material is an alloy including said metal as one of its components.

16. A vacuum type circuit interrupter for interrupting a power circuit carrying oscillating current having recurrent natural current zeros comprising: an envelope evacuated to a pressure lower than $10^{-4}$ mm. of mercury; a pair of spaced-apart terminals for connection to said power circuit; a pair of electrodes located within said envelope, connected in circuit with said terminals, and disposed in spaced-apart relationship during a circuit-interrupting operation to allow for the establishment of a circuit-interrupting arc therebetween; one of said electrodes having a predetermined region on which one of the electrodes spots for substantially all low current arcs is adapted to be maintained; said predetermined electrode region being formed of a material comprising a metal having a vapor pressure at least as great as that of lead in a sufficient quantity to hold the maximum representative chopping current level to no more than four amperes when interrupting currents of less than 50 amperes peak value; said material having a vapor pressure less than $10^{-3}$ mm. of mercury at 500° K.; said electrode region being free of sorbed gases and contaminants to such an extent that if placed in a vacuumized chamber a few litres in volume and then deeply eroded by repeated electric arcing the pressure level in said chamber will remain substantially as low as its initial value, even in the absence of getters and pumps and even if the initial pressure in the chamber is on the order of $10^{-5}$ mm. of mercury; and the chemical affinity of said material for oxygen being relatively low as compared to that of aluminum, magnesium, and calcium.

17. The interrupter of claim 16 in which said metal is present in a sufficient quantity to hold the maximum representative chopping level to about two amperes when interrupting currents of less than 50 amperes peak value.

References Cited in the file of this patent

UNITED STATES PATENTS

| | | |
|---|---|---|
| 1,481,005 | Phillips | Jan. 15, 1924 |
| 1,784,303 | Millikan et al. | Dec. 9, 1930 |
| 1,901,639 | Eschholz | Mar. 14, 1933 |
| 1,934,458 | Wellman et al. | Nov. 7, 1933 |
| 2,027,835 | Rankin et al. | July 14, 1936 |
| 2,156,974 | Doan | May 2, 1939 |
| 2,900,476 | Reece | Aug. 18, 1959 |